Patented Nov. 13, 1945

2,388,905

UNITED STATES PATENT OFFICE 2,388,905

PROCESSES FOR THE AMELIORATION OF RUBBER

Patrice Henri Marie Compagnon and Jean Nicolas Louis Le Bras, Paris, France; vested in the Alien Property Custodian No Drawing. Application April 3, 1942, Serial No. 437,597. In France March 24, 1941

2 Claims. (Cl. 260—768)

The present invention relates to processes for the amelioration of natural rubber. They consist in causing the rubber and unsaturated bodies, more particularly polymerizable vinylic monomers, the vinyl remainder of which is attached to at least one atom, or group of atoms, having electro-negative features, to chemically react, by treatment in a mixer.

In the patent application filed concurrently herewith, the inventors have described a method effecting the copolymerization, in an aqueous dispersion, of rubber and of such derivatives. Now, they have found, according to the present invention, that a similar and probably identical reaction, takes place on simply mixing the constituents in a mixer having tightly clamped cylinders.

It must moreover be pointed out that, in the same way as unsaturated products nonpolymerizable in themselves can be caused to intervene in a copolymerization, such compounds can give rise to the reaction in a mixer. This is the case, in particular, of maleic anhydride, the use of which substance, by its very nature, could not be thought of when working in an aqueous dispersion.

However, the fact that such products can intervene for uniting molecules, or groups of molecules of rubber, permits including them in the description of this invention, under the designation of "monomers."

It will be easily understood that the very conditions of the operation, which permits the use of solid or liquid substances having a relatively high boiling point, render difficult the utilisation of substances having a relatively low boiling point and can then lead to a less extensive field of application than when working in an aqueous dispersion.

The principle of the invention is therefore to cause, by a simple treatment in the mixer, the rubber, from any botanical source, and the previously mentioned unsaturated derivatives to react together. For that purpose, the following method of procedure is adopted: after masticating the rubber, the cylinders are tightly clamped, then the derivative to be combined is incorporated with the liquid rubber, with or without a catalyser. The reaction which occurs, appears, when it has acquired a certain degree, by a "drying up" of the liquid rubber; if it is carried too far, the passage to a creped aspect and to a crumbling of the sheet can be noticed in certain cases.

According to the monomer utilised, the reaction will be effected with or without a catalyser. As catalysers, use can be made, as for the copolymerization, of peroxides; benzoyl peroxide for instance is well adapted, owing to its physical state, to the conditions of operation utilised.

The fact that, in certain cases, catalysers can be dispensed with, allows it to be assumed that, according to the degree of reactivity of the monomer, the conditions of operation can be sufficient for causing the reaction: the latter would then be promoted, either by peroxides, the formation of which during the mixing of the rubber is well known, or by electric phenomena which arise during said mixing, or, again, by the pressure exerted on the mixture when it is rolled.

Besides the existence of catalysers, that of inhibitors is noticed; the latter are numerous and it is curious to find, among them, the presence of reducing agents such as hydroquinone, and of oxidizing agents, such as trinitro-benzene.

As example of monomers, can be cited, acrylic acid, acrylic nitrile, styrolene, maleic anhydride, separately or in mixtures.

The products obtained differentiate, most often, from ordinary rubber, by a practically complete insolubility in rubber solvents (benzene, gasoline, . . .) and a relatively limited swelling. Moreover, a slight thermoplasticity and nervousness of the reaction products is noticed which render the monomers used in these conditions first-class "stiffeners." The modification of the chemical structure is so preponderant that it suffices, for instance, to fix, by means of the mixer 1% of maleic anhydride for the rubber thus modified, although apparently similar to an ordinary masticated rubber, to become practically insoluble in benzene; on the contrary, the same natural rubber, mixed in the same conditions, but without addition of monomer, is completely and rapidly dissolved when in contact with benzene.

Rubbers thus modified can be more or less plasticized according to the degree of polymerization, and can be vulcanized according to the usual methods; according to the starting monomer and the conditions of the reaction, the vulcanized products obtained will swell considerably less in the solvents than those obtained by the same rubber unmodified.

Briefly, it is apparent from the preceding description that the reaction produced occurs between the same agents and gives the same modifications of the properties as that which has been indicated in the patent of the same inventors on copolymerization in an aqueous dispersion; it must therefore be considered also as a copolymerization. It must be pointed out that, to their knowledge, this is the first example of copolymerization carried out in such conditions.

It will be easily understood that if, chemically, the same results can be obtained by treatment in a mixer or by reaction in an aqueous dispersion, the methods of application of the various monomers can be adjusted according to their state and physical properties.

It is also obvious that the same reaction can take place if the rubber has been previously subjected to a treatment which degrades it (mastication, heating, oxidation, etc.), to a peptization or to an increase of its degree of polymerization.

The examples previously mentioned and the experimental details hereinafter are given in order that the invention may be clearly understood, but must not be considered as limiting the same in any way whatever.

*Example 1.*—To milled rubber is added 5% of maleic anhydride, between slightly spaced cylinders. The addition terminated, the mixture is milled between tightly clamped and cold cylinders. The reaction occurs more or less rapidly according to the quantity of rubber in course of treatment.

The reaction product differentiates from ordinary milled rubber by greater nervousness, slight thermoplasticity and nearly complete insolubility in the usual rubber solvents. It can be however treated in the mixer as easily as ordinary rubber, it also lends itself to roving and calendering operations. It can be vulcanized by the usual processes. But, for obtaining good mechanical properties, the retarding effect of maleic anhydride must be corrected by the addition of neutralizing products, polyalcohols, amines, polyamines, etc.

The nervousness and slight thermoplasticity of the milled product renders maleic anhydride a "stiffening" agent superior to all those known up to now. It allows of vulcanizing, in live steam, sheets, threads, tubes, etc. noncharged, without appreciable distortions being observed thereby.

The vulcanized mixtures offer good resistance to swelling agents.

*Example 2.*—To milled rubber is added 2% of benzoyl peroxide, then 10% of acrylic acid; the reaction is effected between tightly clamped and cold cylinders as in Example 1.

*Example 3.*—The same operations as in Example 2 are effected, acrylic acid being replaced by acrylic nitrile. Owing to the volatility of nitrile, a great part of said reagent is lost by evaporation.

Rubber is milled for ¾ of an hour in the cold state, then heated for an hour and a half at 250° in an inert gas; in these conditions, a viscous liquid mass is obtained having a non-saturation only slightly lower than that of raw rubber.

This liquid rubber is placed in solution at 50% in benzene; the solution is emulsified in water containing a soap (1% sodium oleate), a dispersing agent (darvan:1%) a protecting colloid (1% casein); after elimination of the benzene, the emulsion very rapidly gives a cream which contains about 50% of liquid rubber.

The copolymerization product obtained from said cream is a solid and plastic mass which can be worked and vulcanized as ordinary rubber.

*Example 4.*—To liquid rubber obtained as above described is added 2% of benzoyl peroxide and poured over the cylinders of a mixer; 15% of maleic anhydride is added, the reaction is effected as above stated and a solid sheet similar to the preceding ones is obtained.

Applicant's copending application is Jean Nicolas Louis Le Bras and Patrice Henri Marie Compagnon Serial No. 437,596, filed April 3, 1942, Processes for amelioration of rubber.

We claim as our invention:

1. The process of limiting swelling and reducing the solubility of rubber in benzene and like solvents which comprises masticating the rubber, adding approximately five percentum of maleic anhydride and masticating in the cold for a time sufficient to effect a reaction of the rubber with maleic anhydride to obtain a product differing from ordinary masticated rubber by greater nervousness, slight thermoplasticity and nearly complete insolubility in the usual rubber solvents.

2. The process of limiting swelling and reducing the solubility of rubber in benzene and like solvents, which comprises masticating the rubber, adding approximately five to fifteen percentum of maleic anhydride and two percentum of benzoyl peroxide and masticating in the cold for a time sufficient to effect a reaction of the rubber with the maleic anhydride and the benzoyl peroxide to obtain a product differing from ordinary masticated rubber by greater nervousness, slight thermoplasticity and nearly complete insolubility in the usual rubber solvents.

PATRICE HENRI MARIE COMPAGNON.
JEAN NICOLAS LOUIS LE BRAS.